United States Patent [19]

Ayers

[11] E Re. 30,879

[45] Reissued Mar. 9, 1982

[54] METHOD FOR PRODUCING LOW OXIDE METAL POWDERS

[75] Inventor: Maurice D. Ayers, Stamford, Conn.

[73] Assignee: Metal Innovations, Inc., Stamford, Conn.

[21] Appl. No.: 962,373

[22] Filed: Nov. 20, 1978

Related U.S. Patent Documents

Reissue of:

[64] Patent No.: 3,646,176
Issued: Feb. 29, 1972
Appl. No.: 855,096
Filed: Sep. 4, 1969

U.S. Applications:

[63] Continuation of Ser. No. 445,864, Feb. 26, 1974.

[51] Int. Cl.[3] ..... B01J 2/06
[52] U.S. Cl. ..... 264/11
[58] Field of Search ..... 264/11

[56] References Cited

U.S. PATENT DOCUMENTS

| | | | |
|---|---|---|---|
| 1,886,285 | 11/1932 | Martin | 264/11 |
| 2,159,433 | 5/1939 | Ervin | 264/11 |
| 2,636,219 | 4/1953 | Beamer et al. | 264/11 |
| 3,334,408 | 8/1967 | Ayers | 264/11 |
| 3,428,718 | 2/1969 | Helin et al. | 264/11 |
| 3,551,532 | 12/1970 | Laird | 264/11 |

OTHER PUBLICATIONS

Chemical Engineers Handbook, 4th Ed. McGraw-Hill Book Co., New York, 1963, pp. 6-29 to 6-32.

*Primary Examiner*—James R. Hall
*Attorney, Agent, or Firm*—Mandeville and Schweitzer

[57] ABSTRACT

A method is disclosed for producing high purity metal powders having an irregular and angular shape and a very low oxygen content (less than 0.25% oxygen in iron and steel powders). The invention utilizes a high pressure liquid atomization procedure for converting the molten metal to angular particulate form, and provides for the very rapid subsequent cooling of the hot particles under conditions of high pressure sprays and violent turbulence of the powder particles in the liquid that minimize the formation of oxide impurities on the particle surface. High pressure atomization to produce angular and irregular particles tends to create an oxidizing environment because of the mixture of hot particles and liquid. By rapidly quenching the particles immediately after formation, in a quenching environment that creates a violently turbulent condition at the surface of the metal, the formation of vapor or steam films is minimized and more rapid heat transfer from the particles to the cooling medium is realized.

10 Claims, 3 Drawing Figures

METHOD FOR PRODUCING LOW OXIDE METAL POWDERS

Matter enclosed in heavy brackets [ ] appears in the original patent but forms no part of this reissue specification; matter printed in italics indicates the additions made by reissue.

*This is a continuation of application Ser. No. 445,864, filed 2/26/74 for Reissue of U.S. Pat. No. 3,646,176.*

BACKGROUND OF THE INVENTION

Metal powders have gained increasing popularity in recent years mainly because of new, practical and commercially feasible methods for producing them. Metal powders can be produced by a number of processes including atomization of the molten metal by liquids or gases under pressure. A particularly advantageous method for the liquid atomization of molten metals, particularly iron or steel, is disclosed in my U.S. Pat. No. 3,334,408. Briefly, the method disclosed in the foregoing patent involves the use of high velocity, thin, solid, flat streams of cooling liquid that angularly impinge upon a stream of the molten metal to disperse it into fine, irregularly shaped powder particles. The powder particles thus formed are quenched and may be subsequently molded or compacted into coherent forms having many commercial applications.

I have found that the techniques adopted for the production of optimum powder shapes (i.e., irregular, angular) are inherently conducive to rapid surface oxide foramtion. Thus, iron powders produced by the liquid atomization of molten iron or steel generally have an oxygen content of more than about 0.7% after quenching and between about 0.8% and 1.0% after being dried. In order to use such iron powders for high quality products, (i.e., those requiring a low oxide impurity grade iron), the oxygen content of the powder should be reduced to less than about 0.25%. The removal of such oxide impurities from iron powders can be accomplished by annealing the powder in a reducing atmosphere in accordance with well known procedures. However, the annealing process can have adverse effects on the powder, as by undesirably increasing the grain size. It also has been found that the annealing of iron powder relieves energy and internal stresses in the particles which I have found to be advantageous for the subsequent, processing of wrought products.

The oxidation of iron powder particles produced by liquid atomization of the molten metal is a function of many variables, including the particle size, time at elevated temperature, and environment. Iron powder will oxidize very rapidly at tempeartures down to about 300° F. in an oxidizing environment. However, when cooled to below about 200° F., the oxidation rate is relatively slow. Oxide formation also, of course, occurs during the drying of liquid atomized powder, which tends to compound the problem of high oxide formation.

Heretofore, where low oxide powders have been required, it has been conventional to utilize gas atomizing techniques, rather than liquid atomization, to derive the metal powders. However, gas atomizing techniques have many significant disadvantages. For one thing, the production capacity of a gas atomizing system is very low, as there is a relatively low rate of heat transfer between the hot metal and the atomizing gas. Additionally, the cost of the atomizing gas, which must be inert, is a significant factor in the economics of the system. Moreover, since the metal is cooled down at a relatively slow rate by gas atomization procedures, the atomized metal forms into particles of spherical shape, and particles of spherical shape are disadvantageous, as compared to irregular, angular particles produced by liquid atomization, for many end uses. Thus gas atomization has not provided a satisfactory answer to the production of low oxide atomized powder.

SUMMARY OF THE INVENTION

The present invention is directed to a process enabling low oxide atomized metal powders to be produced by liquid (typically water) atomizing procedures. This enables the high production capacities and favorable economics of the liquid atomizing techniques to be realized, and also accommodates the production of angularly shaped, irregular metal particles, which are advantageous for subsequent processing.

In accordance with the present invention, molten metal is subjected to liquid atomization in a procedure of two or more distinct but closely timed stages. In the first stage, a controlled stream of the molten metal is acted on by thin, flat, solid sheets of atomizing liquid, which are disposed to intersect in the form of a V and are ejected under extremely high pressure (e.g., about 500 p.s.i. or greater). The interception of the molten metal by the high pressure flat streams causes the molten metal stream to be shattered and dispersed into fine metal particles of the desired angular, irregular shape. Almost immediately thereafter, the atomized metal particles, still at high temperature, are struck by a second set of liquid jets, the function of which is to effect extremely rapid transfer of heat from the hot metal particles to the liquid by intimate contact between the water and the particles under conditions of substantial velocity and agitation. The hot particles are maintained continuously in highly turbulent contact with cooling liquid, until the particles are reduced to a temperature of, say, 200° F., at which temperature the tendency to oxidize is significantly reduced. Typically, the process is carried out by directing the particles, immediately after being struck by the second or quenching stage of liquid jets, into a highly turbulent water body which disperses the particles and continues the cooling to a desired final level of around 200° F. or below.

In the process of the invention, an inert environment advantageously is maintained at the stages in which the metal is initially atomized and then quenched by jets of atomizing and cooling liquid, in order to reduce to a minimum the exposure of the metal to oxygen during its critical, higher temperature stages. In all events, positive steps are taken to preclude the entry of air into the atomizing zone. Nevertheless, oxygen can be available for reaction with the high temperature metal particles (e.g., from dissociation of the cooling water itself or from water vapor), and the rapid quenching of the atomized particles to a temperature below that at which oxidation reactions readily occur is a critical aspect of the present process. In this respect, once the molten metal stream is disintegrated into fine metal particles, the surface area available for oxidation reactions is enormously increased, and the tendency to form oxides is correspondingly increased.

In accordance with a specific aspect of the invention, the atomization-quenching sequence is required to be carried out in two or more distinct stages, in order to achieve the combined results of a small, angular, irregularly shaped particle and a sufficiently low overall oxygen content. In this respect, in order to achieve the small, angular, irregular particle which is desired in accordance with the invention, it is necessary to intercept a descending metal stream, typically of $\frac{1}{4}$ to $\frac{1}{2}$ inch in diameter, with a pair of intersecting thin, flat, solid streams of [quenching] *atomizing* liquid, typically water, at high pressure. If these atomizing streams are sufficiently thin (i.e., using spray nozzle openings about 1/32 to 1/16 of an inch in thickness) to achieve the desired particle size and shape, they lack sufficient liquid volume to achieve sufficient heat transfer from the particles in the region of water and hot metal contact to avoid substantial oxidation. In other words, I have found that the requirements of achieving a sufficiently high rate of heat transfer, on the one hand, and a desired particle shape and size, on the other, with a single set of liquid streams, are mutually inconsistent. Under the procedure of the invention, the atomized metal, in the instants immediately following atomization, is again forcibly struck by a second set of liquid streams. The second set of streams is of sufficient thickness and volume to effect a high rate of heat transfer from the high temperature particles, and to rapidly cool the particles. At the second stage of liquid jets, the metal already has been atomized and is of the desired shape and size, so that the second stage of jets, referred to as the quenching stage, is controlled for optimum heat transfer.

Desirably, even after the quenching stage of jets, the particles are directed immediately into a turbulent body of cooling water which further cools the particles down to below 200° F. A condition of violent turbulence between the particles and quenching water must be maintained, until the particles are in a temperature below the boiling point of the water. This avoids any sustained contact of the metal surfaces with steam or water vapor, which are highly reactive, oxide-forming media.

Iron powder, for example, can be produced in accordance with the invention to have an oxygen impurity content at the extraordinarily low level of significantly less than 0.25 percent, even after drying, it being understood that, under normal circumstances, iron powder will be subject to some oxide formation (and therefore additional oxygen pick-up) during a drying step, because of the elevated temperature conditions necessarily involved in the economical drying of water atomized powders.

The techniques of the present invention are especially significant in the production of atomized powders from certain classes of metals and alloys. Many alloyed materials contain oxygen-reactive components such as chromium, aluminum, titanium, manganese, silicon, etc. The oxides formed with many of these reactive materials are difficult, if not impossible, to reduce in subsequent operations. Therefore, the techniques of water atomizing these materials under circumstances which substantially minimize the formation of oxides in the first instance are especially valuable. Even in the case of ordinary iron and steel materials, where objectionable oxides formed during more conventional water atomizing processes might be reduced in subsequent stages, complications may arise quite apart from the unfavorable economics of the additional reducing operations, in the sense that the reducing operations typically are accompanied by grain growth. Thus, in the end, it may not be possible to achieve with conventional procedures the finer grain structures which are desirable for many end uses.

For a more complete understanding of the invention, reference should be made to the following detailed description and to the accompanying drawing.

DESCRIPTION OF PREFERRED EMBODIMENTS

Figure 1:
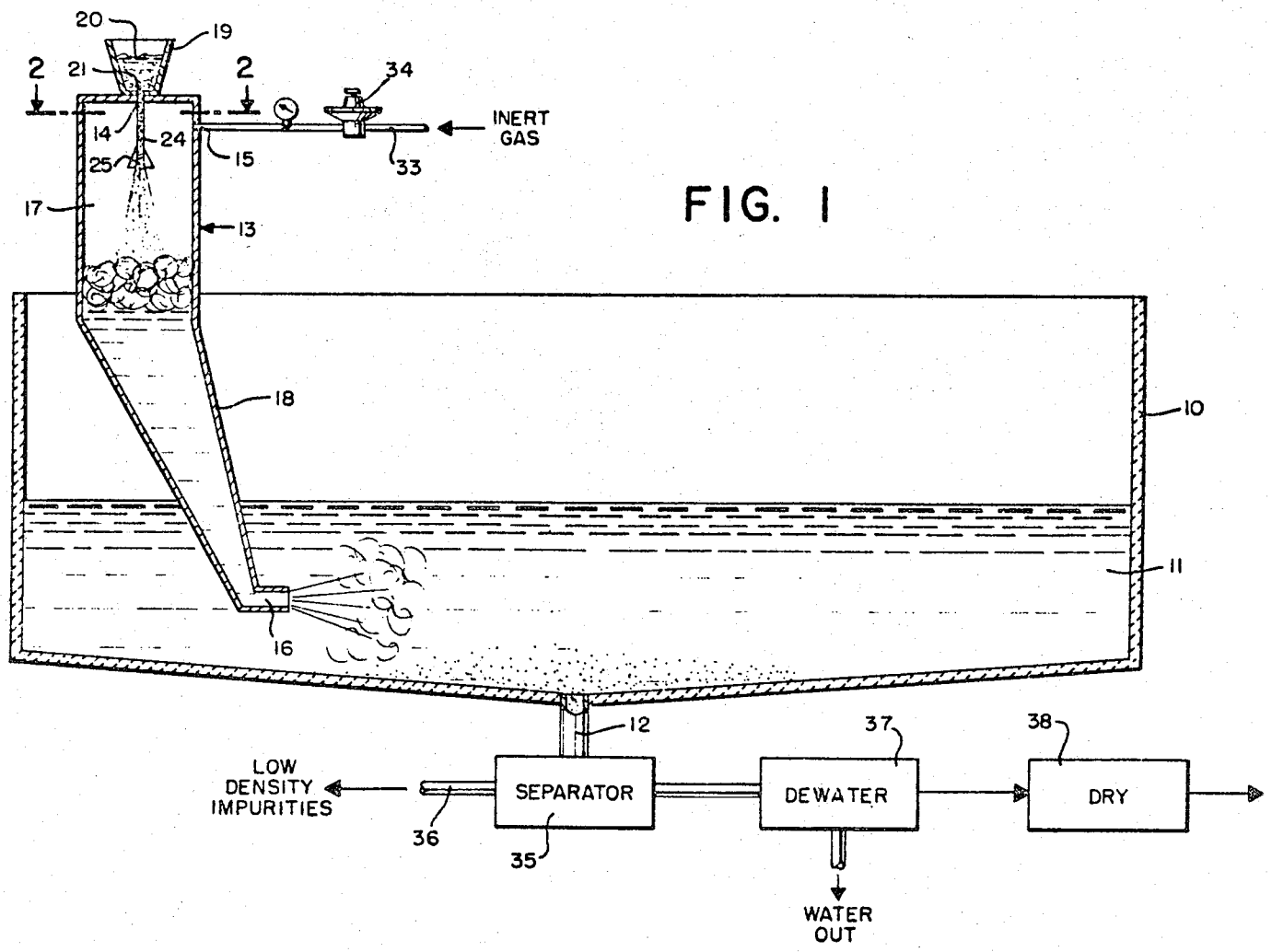
FIG. 1 is a simplified, schematic representation of a liquid atomization process incorporating the principles of the invention.

Referring now to the drawing, the reference numeral 10 designates a large open top receiving tank. The receiving tank retains a large body of cooling liquid, typically water, designated by the reference numeral 11. The tank is also provided with an outlet opening 12 for removal of water and particulate matter, as will be described.

Suitably mounted on the receiving tank 10 is an atomizer housing 13. In accordance with the invention, the housing 13 constitutes, in effect, a sealed enclosure. It is provided, however, with an opening 14 at the top for the instruction of molten metal for atomization, with an opening 15 in an upper portion thereof for the emission of inert gas, and with a discharge opening 16 in its lower extremity, below the water level in the retaining tank 10. As indicated in FIG. 1, the discharge end 16 of the atomizer housing is of smaller dimensions than the upper portions thereof constituting the atomizing chamber 17. By way of example, in an apparatus of typical proportions for pilot-scale operations, the atomizing chamber portion of the housing may be of generally rectangular cross-section, having a width dimension on the order of 15 inches and a thickness dimension on the order of 10 inches. The discharge opening 16, on the other hand, may have a thickness dimension (vertical in FIG. 1) on the order of 2–3 inches, with a width dimension on the order of 15 inches. Between the atomizing chamber 17 and the discharge opening 16 the atomizer housing advantageously tapers gradually in its thickness dimension and angles forwardly somewhat in a water leg section 18.

At the top of the atomizer housing 13 there is a receiving crucible 19 adapted, when the system is in operation, to receive a body of molten metal 20. The crucible 19 has an opening 21 in its bottom wall, which communicates with the interior of the atomizer housing 13 and provides for the gravity discharge of molten metal in a solid stream. Advantageously, the descending stream of molten metal is on the order of $\frac{3}{8}$ of an inch in diameter, although somewhat larger sizes (e.g., $\frac{1}{2}$ inch) may be utilized in some instances. It is indicated that optimum performance is realized using metal streams of this order of diameter. Accordingly, if sufficient atomizing capacity can not be achieved with a single metal stream on the order of $\frac{3}{8}$–$\frac{1}{2}$ inch diameter, a plurality of such streams should be utilized to increase capacity, rather than to further increase the diameter of the metal stream.

Figure 2:
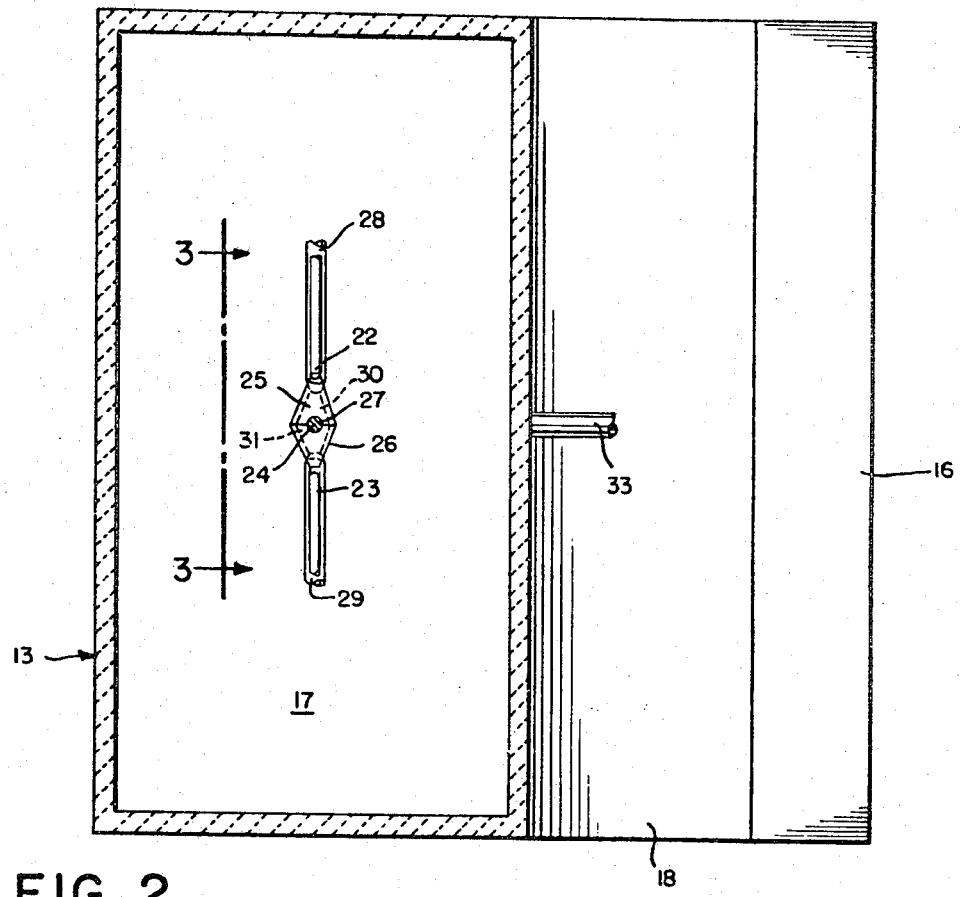
FIG. 2 is an enlarged cross section taken generally on line 2—2 of FIG. 1.

In accordance with the invention, two sets of liquid spray jets are provided in the atomizing chamber 17, disposed to act in rapid sequence upon the descending stream of molten metal. As shown in FIG. 2, a first pair of water discharge nozzles 22, 23 is disposed symmetrically on opposite sides of the descending, coherent stream of molten metal 24. The nozzles 22, 23 are directed downward and inward at an angle of 15°-30° from the vertical, and are arranged to direct controlled jets of atomizing water into intercepting relation to the molten metal stream 24.

As a significant facet of the invention, it is important to derive, in the metal atomizing stage, metal particles which are fine in size and are angular and irregular in configuration. This is achievable through the use of thin, flat, solid streams 25, 26 of atomizing water, ejected from the nozzles 22, 23 at high pressure. For optimum results, the atomizing streams 25, 26 are ejected under pressures of 500-1000 p.s.i. The nozzle openings, through which the water streams are ejected optimally are of rectangular configuration, measuring about ½ inch in width and 1/32 inch in thickness. These nozzles eject solid, flat streams 25, 26 of water from points around 5 inches or so away from the point 27 of intersection with each other and with the descending metal stream 24. In the short distance between the nozzle tip and the point of intersection 27, the water streams will fan out somewhat to a width of about 3 inches, as indicated in FIG. 2, and may increase slightly in thickness, but will essentially retain their flat, thin, solid, characteristic.

The interaction of the high pressure water streams 25, 26 with the descending molten stream 24 causes the molten metal stream to be literally shattered and broken up into fine particles. The particles are almost instantly solidified and, due to the violence and rapidity of the solidification, the particles are derived in an irregular and angular configuration, which is highly desirable. In accordance with the invention, the interaction of the water streams 25, 26 and the descending stream of molten metal 24 is such as to produce particles substantially all of which are minus 40 mesh in size. This means that almost all of the particles produced would pass through a 40 mesh screen (U.S. Sieve Series, A.S.T.M. specification E-11-61). More desirably, the atomizing interaction is so controlled as to achieve angular, irregular particles largely of minus 80 mesh size.

A critical facet of the present invention involves, in addition to the production of fine, atomized particles as described immediately above, the maintenance during the atomizing process of relatively non-oxidizing conditions and, in addition, the quenching of the atomized particles in the fastest possible time to a temperature below which oxidation readily occurs. Extremely rapid quenching of the atomized particles is enabled, in part, by the production in the first instance of particles of suitable fineness, and so the conduct of the atomizing stage itself is an integral part of the invention. It has been observed, however, that the formation of atomized particles of the desired size and shape, and the sufficiently rapid transfer of heat from these particles tend to be mutually inconsistent objectives, at least when using a single set of nozzles. Accordingly, as an important part of the invention, a second set of water nozzles 28, 29 is provided in the atomizing chamber, arranged to direct streams of water 30, 31 into intersecting impingement at 32, just slightly below the intersecting impingement 27 of the principal atomizing streams 25, 26. Advantageously, the water streams 30, 31 which may be referred to for convenience as the quenching streams, are brought as close up to the atomizing streams 25, 26 as practicable without causing interference with the action of the atomizing streams. In practice, in an atomizing apparatus of the general dimensions and configurations described, the quenching streams may intersect at a point from as close as about ¼ inch to as for as about 2 inches below the intersection of the atomizing streams, with a more typical spacing being about ¾ inch.

Figure 3:
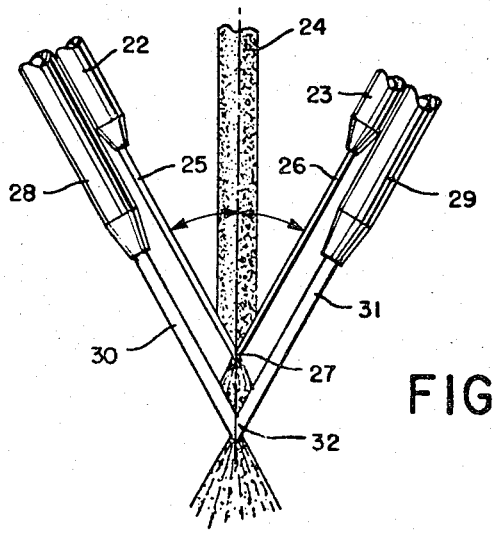
FIG. 3 is an enlarged cross section taken generally on line 3—3 of FIG. 2.

The quenching nozzles 28, 29 may be operated at a somewhat lower pressure than the atomizing streams, say, on the order of 100 p.s.i. or more and typically around 200 p.s.i., and may advantageously deliver quenching water in solid streams of somewhat greater thickness than the atomizing streams, substantially as illustrated in FIG. 3. The objective in the case of the quenching streams, is to envelope the just-atomized particles in a substantial volume of water, accompanied by violent turbulence. This provides for the fastest possible transfer of heat from the small metal particles to the quenching water, by minimizing sustained contact between the hot particles and unagitated water. This minimizes the formation of surface films of steam or vapor that tend to form during the quenching. In this respect, it will be understood, that steam is a highly reactive oxidizing medium, and surface oxides will quickly form if there is sustained exposure of the particles to such steam films.

Most advantageously, even after exposure of the metal particles to the quenching streams 30, 31, it is desirable to follow immediately with a further cooling stage, in order to bring the particles well below the temperature at which oxidation is promoted. In one practical form of the invention, the quenched particles are flowed downward through the water leg 18 of the atomizer housing, and ejected out through the more or less horizontally disposed discharge opening 16 into the body of water 11. Desirably, the water issuing from the discharge nozzle 16 has sufficient forward discharge velocity to maintain a desired condition of substantial turbulence within the water body 11. However, supplementary agitation of the main body 11 of cooling water may be provided, if necessary or desirable. Advantageously, the water utilized for quenching and cooling may be heated to reduce its content of dissolved oxygen, to further reduce the exposure of the metal to oxidizing conditions.

In the practice of the invention, the range of particle sizes plays an important part, because there is a significant, inverse ratio between the mass of the individual particles and the surface area available for cooling contact (and also oxidation). In general, the smaller the particle size the better, up to a point. Heat is more readily extracted from a small particle, because of its favorable surface area-to-mass ratio. On the other hand, if the particles are too small, an excessive area is presented for possible oxidizing reaction, not only during quenching and cooling, but during subsequent drying, handling and storage. Moreover, if the particles are too small, compaction of the powder to form wrought products is made difficult. Optimum results in the practice of the invention are realized when the particles are almost exclusively minus 40 mesh, and preferably minus 80 mesh; advantageously, however, not more than about 60% of the particles are minus 325 mesh in size.

Notwithstanding the introduction of substantial quantities of water (e.g., 50 gallons or over per minute in the pilot-sized equipment described) through the atomizing and quenching nozzles, and the introduction of metal, the action of the high velocity water jets within the atomizing chamber causes a substantial reduction in the ambient pressure of the chamber. This causes water to be drawn into the water leg 18 from the main cooling body 11, somewhat in the manner illustrated in FIG. 1. In a unit of the proportions described, a pressure reduction of 26 inches of water or more can occur, which means that the water will rise that far in the water leg 18 above the level of the water 11. Since the water retained internally of the atomizer housing 13 is in a state of violent turbulence, internally and at the surface, steps must be taken to avoid interference of the drawn-up water with the action of the atomizing and quenching jets. Under certain conditions, it might be possible to accomplish this by simply increasing the height of the water leg 18, such that the atomizing nozzles were located sufficiently high above the level of the cooling water to avoid any interference. However, it appears that, when this is done, the just-quenched particles are retained too long in the warmer water of the water leg before reaching the large body of cooling water 11. Accordingly, as an advantageous feature of the invention, provisions are made for controllably increasing the pressure within the atomizing chamber 17, partially to compensate for the pressure reducing action of the atomizing and quenching jets, and thereby controlling the height of water in the water leg 18 and expediting passage of the atomized particles out through the discharge opening 16 and into the large body of cooling water. In the system of FIG. 1, pressure in the atomizing chamber is controllably increased by means of a supply (not shown) of inert gas, typically argon, which is fed in through a conduit 33, through a flow or pressure regulator 34. In a typical operation of the described apparatus, the regulator 34 may be set at a level which will retain, say, a 15 to 20 inch column of water in the water leg 18, which, even allowing for substantial surface turbulence, will usually provide sufficient clearance below the atomizing and quenching jets to avoid interference. In a typical operation of the proportions indicated, a gas consumption of about 100 cubic feet per hour is sufficient to maintain effective pressure control within the chamber and thereby properly control the water leg column. The out-gassing of the metal itself may be utilized to advantage in controllably increasing the pressure in the atomizing chamber 17. For example, certain formulations of steel provide a "gassy" melt, because of the presence of oxygen and advantage may be taken of the evolution of the gas during the atomizing process to help maintain controlled pressure within the chamber. The oxygen generally combines with carbon present in the melt, during solidification, and come off as carbon monoxide (CO) gas. Normally, of course, the out-gassing of the molten metal is insufficient, in itself, for adequate pressure control, and supplementary quantities of inert gas are introduced by the regulator 34.

Usually, it is desirable to purge the atomizing chamber 17 prior to the commencement of the atomizing operation. Typically, this can be done by introducing argon into the interior of the atomizer housing, expelling the atmospheric air, and then sealing over the crucible opening 21 with a destructible film, such as aluminum foil. When the molten metal subsequently is poured into the crucible, the seal is instantly broken. However, the molten metal itself functions as a seal, as long as a quantity thereof remains in the crucible 19.

The production of water-atomized metal powders in accordance with the invention can be carried out in a manner to achieve oxide levels which have never before been achieved in a water atomizing process. In this respect, it is possible to achieve water atomized powder, the oxygen content of which is far below the 0.25% level at which it becomes necessary to perform further, costly reduction processes to condition the metal properly for many end uses. Even so, the powder produced in accordance with the invention should be handled at subsequent stages in an appropriate manner so that the dried powder available for ultimate utilization in the formation of wrought products or compacts, remains well below the 0.25% oxygen content level.

As illustrated in FIG. 1, the receiving tank 10 has its outlet 12 connected to a suitable separating device, usually of a centrifugal type, designated by the numeral 35. Periodically (or continuously, if desired) water and entrained particles are flowed or pumped to the separator 35, which is adapted to remove low density impurities such as slag, furnace refractories, etc. The impurities are discharged at 36, and the mixture of water and higher density particles is suitably drained at 37 to remove most of the water content. Thereafter, the still wet powder containing from 1% to as much as 15%-20% water, is taken directly to a drying facility 38, where the remaining water is removed. Advantageously, the drying facility 38 is a vacuum dryer, from which the air is first exhausted (eliminating oxygen), and then the powder is heated to about 160°-180° F. (i.e., less than 200° F.) while retaining the vacuum of about 28 inches of mercury. This results in a dried powder with minimum oxide gain from its as-atomized, wet condition. Alternatively, the powder may be dried in a reducing atmosphere. However, vacuum drying appears to have economic advantages.

The ability to produce water-atomized powders, of iron, steel, and other materials, with the extremely low oxygen content enabled by the present invention, permits extraordinary economic advantages to be realized. By way of example, an iron or steel powder thus produced, having an oxygen content well below 0.25%, can be used directly in the manufacture of strip and wrought products, without undergoing special reducing processes. Thus, iron and steel powders produced in accordance with the invention generally will have no more than an extremely thin oxide film at the surface, as is evidenced by a light gray cast. This thin film can be flashed off quickly and economically in a reducing atmosphere after compaction of the powder into a green strip and while the green strip is being conveyed through a furnace for heating to temperatures suitable for hot rolling. More conventional powders, having high oxygen content if water atomized, typically will have to be reduced separately, prior to formation of the green compact. The much heavier oxide coating of conventionally water atomized particles is characterized by a dark gray or black surface coloration (reflecting an oxygen content of 0.8% or more), in the case or iron and steel particles.

In some cases, as where it is desired to produce wrought products from iron powders having a high carbon content, it may be necessary to utilize a preliminary tempering heat treatment to soften the high carbon powder sufficiently to carry out the compacting operation. In such cases, the cost of a separate heating operation cannot be avoided. However, important advantages are still realized, in that it is possible to carry out the heating step at comparatively low temperatures (1000°-1200° F.) without significantly changing the composition of the metal. In this respect, if there is substantial oxygen present with high carbon powder, there is a tendency for the carbon and oxygen to react, forming CO and $CO_2$. Carbon may also react with hydrogen at temperatures sufficient to remove the oxygen. This results in an undesirable composition change, where a high carbon product is desired.

The avoidance of a separate reducing step, made possible by the atomizing procedures of the invention, also has important ramifications in respect to grain formation. Thus, by the extremely rapid atomization, quenching and cooling accomplished in accordance with the invention, exceedingly fine grain sizes within the particles are realized. This is highly desirable for many applications. If a separate reducing operation is required, as in conventional processes, a grain growth (within the much larger atomized particles) necessarily results, through an irreversible process. Materials manufactured in accordance with the present invention, inherently will have specially fine grain sizes. If, for some reason, larger grain sizes are desirable, they may be achieved through subsequent appropriate heat treating processes. However, the reverse is not true of conventionally produced material.

An important advantage, derived from the avoidance of a reducing step after atomization, resides in the ability to compact the powder into strip, rods, forging blanks, etc., while the powder remains in its internally stressed, "as-atomized" condition. This represents a high energy state of the atomized particles, which favorably influences the achievement of final products of desired density and coherency.

By way of examples, typical metal powders produced in accordance with the invention may be of the following representative analysis:

| | Percent |
|---|---|
| (I) Low carbon steel, dried in alcohol | |
| Carbon | .05 |
| Manganese | .24 |
| Silicon | .12 |
| Sulphur | .031 |
| Phosphorus | .007 |
| Oxygen | .136 |
| (II) Low carbon steel, dried in alcohol | |
| Carbon | .038 |
| Manganese | .26 |
| Silicon | .14 |
| Sulphur | .030 |
| Phosphorus | .008 |
| Copper | .01 |
| Oxygen | .168 |
| (III) High carbon steel, dried in alcohol | |
| Carbon | .39 |
| Manganese | .20 |
| Silicon | .03 |
| Sulphur | .01 |
| Phosphorus | .005 |
| Copper | .09 |
| Nickel | .05 |
| Chrome | .37 |
| Oxygen | .18 |
| (IV) Stainless steel (razor blade grade), vacuum dried | |
| Carbon | .60 |
| Chrome | 12.63 |
| Manganese | .71 |
| Silicon | .28 |
| Sulphur | .01 |
| Oxygen | 0.21 |
| (V) Nickel alloy, vacuum dried | |
| Nickel | 29 |
| Cobalt | 17 |
| Iron | 54 |

-continued

| | Percent |
|---|---|
| Oxygen | 0.16 |
| (VI) Nickel alloy, vacuum dried | |
| Nickel | 78 |
| Molybdenum | 2 |
| Iron | 19 |
| Oxygen | 0.09 |
| (VII) Copper alloy, open dried | |
| Copper | 84.5 |
| Zinc | 15.43 |
| Iron | 0.005 |
| Lead | 0.003 |
| Oxygen | 0.09 |

Samples I, II and III reflect a final oxygen content of 0.18% for high carbon steel and less than 0.17% for low carbon steel. Powders of corresponding analysis, water atomized by conventional procedures, would reflect an oxygen content of well over 0.25% after drying and would surely require a separate reduction procedure for most end uses. Sample IV reflects an oxygen content of 0.21% after drying, whereas material of similar analysis, atomized conventionally, would typically have an oxygen content of over 0.25%. Sample V is a nickel-steel alloy powder reflecting an oxygen content of 0.16%. Samples VI and VII are nickel and copper alloy powders reflecting oxygen contents of 0.09%. In all samples, the techniques of the invention have enabled a significantly lower oxygen content to be realized in the dried powder.

The oxygen contents reflected in the foregoing analyses have not, heretofore, been attainable or even approachable, using water atomizing techniques. Considering oxygen content alone, it has been possible to achieve such low levels using inert gas as the atomizing medium. However, atomizing processes using inert gas as the operative medium have fundamental disadvantages which more than compensate for their ability to achieve low oxide production. For one, the production rate is extremely slow; for another, the powder configuration is essentially spherical, because of the slow rate of heat transfer; and, for another, the economics of atomizing with inert gas are quite unattractive.

The process of the present invention are ideally suited for production on an industrial scale, using equipment of a practical, trouble-free nature, which can be set up and operated on an economic basis.

It should be understood, of course, that the foregoing description of the invention is intended to be representative only. Reference should be made to the following appended claims in determining the full scope of the invention. In the foregoing specification, and in the claims, the term "iron" shall be considered to include steel, wherever the context admits thereof, and the term "steel" shall be considered to include alloys containing 50% or more iron by weight.

I claim:

[1. A method of atomizing molten metal to a powder having irregular, angular particles predominantly of 40 to 325 mesh, and in which while normally oxidizable under water atomizing conditions, said formed metal powder contains less than 0.25 percent oxygen by weight, comprising:

(a) directing downwardly a stream of molten metal into an enclosed atomizing chamber to preclude the entry of air thereinto;

(b) impinging upon said stream of metal in a first stage, a pair of opposed, thin, flat solid streams of water directed downwardly at an angle of 15–30 degrees from the vertical and under a pressure of at least 500 p.s.i. to atomize said metal stream into said irregular particles;

(c) quenching immediately thereafter said formed particles by violently turbulent contact with water, including at least impinging upon said formed particles in a second stage immediately below said first stage opposed high pressure jets of water, to rapidly quench by said violently turbulent contact with water said formed particles to a temperature below which oxidation of said formed particles readily occurs, to minimize the formation of surface films of steam and the exposure of said particles to said films, and (d) collecting said quenched metal particles in a body of water for further cooling.]

[2. The method of claim 1 wherein the water from said opposed streams and opposed jets is discharged with said quenched metal particles from said atomizing chamber into an open body of water.]

[3. The method of claim 1 wherein said water and said metal particles are horizontally discharged beneath the surface of said body of water with sufficient velocity to maintain substantial turbulence therein.]

[4. The method of claim 1 further characterized by:

(a) separating from the water and cooled metal particles, particles of lower density than said metal particles;

(b) separating thereafter the metal particles from the water, and (c) drying under non-oxidizing conditions said metal particles which have an oxygen content less than 0.25% by weight.]

*5. A method of atomizing molten iron or steel to a powder having irregular, angular particles predominantly of 40 to 325 mesh, and in which while normally oxidizable under water atomizing conditions, said formed metal powder contains less than 0.25 percent oxygen by weight, comprising:*

*(a) discharging a stream of molten iron or steel into an enclosed non-vented atomizing chamber having an open lower end,*

*(b) impinging upon said stream of molten metal in an atomizing zone of said enclosed chamber, a first stage of opposed thin flat, solid streams of water directed downwardly at an angle to the vertical under sufficient pressure to atomize said molten stream into said irregular particles,*

*(c) quenching immediately thereafter said formed particles by violently turbulent contact with water, including at least impinging upon said formed particles in a second stage immediately below said first stage, opposed high pressure jets of water, to quench by said violently turbulent contact with water, said formed particles to a temperature below which oxidation of said formed particles, occurs, to minimize the formation of surface films of steam and the exposure of said particles to said films,*

*(d) discharging atomizing and cooling water from the lower end of said atomizing chamber in a stream of smaller cross section than the cross section of the non-vented atomizing chamber in the region of the atomizing zone,*

*(e) the action of the high velocity water jets within said enclosed chamber effecting a partial evacuation of said chamber under normal operating conditions,*

*(f) maintaining the lower end of the atomizing chamber below the surface of a body of water,*

*(g) discharging the atomizing and cooling water, along with the atomized particles, into said body of water, and*

*(h) controlling and limiting the rise of water within the atomizing chamber, resulting from said partial evacuation, by controllably introducing into the upper portion of the chamber a non-oxidizing gas.*

*6. A method of atomizing molten metal to a powder having irregular, angular particles predominantly of 40 to 325 mesh, and in which while normally oxidizable under water atomizing conditions, said formed metal powder containing a low oxygen content, comprising:*

*(a) directing a stream of the molten metal into an enclosed non-vented atomizing chamber having an open lower end of smaller cross section than said atomizing chamber,*

*(b) in an atomizing zone of said chamber, impinging on said stream of metal, in a first stage, a first pair of opposed, flat, solid high pressure streams of water directed downwardly at an angle to the metal stream,*

*(c) said first pair of streams being under sufficient pressure to atomize said metal stream into said irregular particles,*

*(d) quenching immediately thereafter, said particles, by violent turbulent contact with at least one additional pair of opposed high pressure jets of cooling water,*

*(e) the action of the high pressure jets of cooling water within said enclosed chamber effecting a partial evacuation of said chamber under normal operating conditions,*

*(f) discharging the quenched particles, along with the atomizing and cooling water, from the bottom of said chamber into a body of water below the surface thereof, and*

*(g) introducing a non-oxidizing gas into the upper portion of said chamber to control and limit the rise of water into said upper portion of said chamber resulting from said partial evacuation.*

*7. A method of atomizing molten metal which comprises*

*(a) introducing a stream of molten metal into the upper end of an effectively enclosed non-vented atomizing chamber having an open lower end forming a discharge opening of smaller cross section than said atomizing chamber,*

*(b) in an atomizing zone of said chamber, impinging on said metal stream with two or more pairs of opposed high pressure streams of water,*

*(c) discharging the water and atomized metal particles from the lower end of the atomizing chamber,*

*(d) maintaining a body of collecting water at a level above the discharge opening of the atomizing chamber,*

*(e) the action of said water jets in said chamber effecting a partial evacuation therein which raises the water level in said atomizing chamber, and*

*(f) controlling and minimizing said pressure reduction, and thereby controlling and limiting the raising of the water level in said atomizing chamber, by the introduction into an upper portion of said atomizing chamber of a gas having non-oxidizing characteristics with respect to the metal.*

*8. The method of claim 6 wherein the water and the formed metal particles are discharged from an opening in*

*the lower end of said chamber, said opening having a cross sectional flow area less than that in the atomizing zone of said non-vented atomizing chamber.*

*9. The method of claim 7 wherein at least the first pair of water jets are discharged at a pressure of at least 500 psi.*

*10. The method of claim 9 wherein said first pair of water jets are flat and solid.*

*11. A method of atomizing molten metal to a powder having irregular, angular particles predominantly of 40 to 325 mesh, and in which while normally oxidizable under water atomizing conditions, said formed metal powder contains less than 0.25 percent oxygen by weight, comprising:*

*(a) directing downwardly a stream of molten metal into an enclosed atomizing chamber to preclude the entry of air thereinto;*

*(b) impinging upon said stream of metal in a first stage, a pair of opposed, thin, flat solid streams of water directed downwardly at an angle of 15–30 degrees from the vertical and under a pressure of at least 500 p.s.i. to atomize said metal stream into said irregular particles;*

*(c) quenching immediately thereafter said formed particles by violently turbulent contact with water, including at least impinging upon said formed particles in a second stage immediately below said first stage opposed high pressure jets of water, to rapidly quench by said violently turbulent contact with water said formed particles to a temperature below which oxidation of said formed particles readily occurs, to minimize the formation of surface films of steam and the exposure of said particles to said films, and*

*(d) collecting said quenched metal particles in a body of water for further cooling.*

*12. The method of claim 11 wherein the water from said opposed streams and opposed jets is discharged with said quenched metal particles from said atomizing chamber into an open body of water.*

*13. The method of claim 11 wherein said water and said metal particles are horizontally discharged beneath the surface of said body of water with sufficient velocity to maintain substantial turbulence therein.*

*14. The method of claim 11 further characterized by:*

*(a) separating from the water and cooled metal particles, particles of lower density than said metal particles;*

*(b) separating thereafter the metal particles from the water, and*

*(c) drying under non-oxidizing conditions said metal particles which have an oxygen content less than 0.25% by weight.*

* * * * *